(12) United States Patent
Kassoff et al.

(10) Patent No.: US 9,170,768 B2
(45) Date of Patent: Oct. 27, 2015

(54) MANAGING FAST TO SLOW LINKS IN A BUS FABRIC

(71) Applicant: Apple Inc., Cupertino, CA (US)

(72) Inventors: Jason M. Kassoff, Denver, CO (US);
Kevin C. Wong, Los Altos, CA (US);
Brian P. Lilly, San Francisco, CA (US);
Gurjeet S. Saund, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 367 days.

(21) Appl. No.: 13/726,437

(22) Filed: Dec. 24, 2012

(65) Prior Publication Data

US 2014/0181571 A1  Jun. 26, 2014

(51) Int. Cl.
*G06F 5/06* (2006.01)
*G06F 13/38* (2006.01)

(52) U.S. Cl.
CPC . *G06F 5/06* (2013.01); *G06F 13/38* (2013.01)

(58) Field of Classification Search
CPC .................................. G06F 13/38; G06F 5/06
See application file for complete search history.

(56) References Cited

U.S. PATENT DOCUMENTS

| | | | |
|---|---|---|---|
| 6,016,526 A * | 1/2000 | Arimilli et al. | 710/105 |
| 6,393,506 B1 * | 5/2002 | Kenny | 710/113 |
| 8,274,971 B2 | 9/2012 | Battle et al. | |
| 2007/0081414 A1 * | 4/2007 | Douady et al. | 365/233 |
| 2012/0311371 A1 * | 12/2012 | Shaeffer | 713/501 |

FOREIGN PATENT DOCUMENTS

| | | |
|---|---|---|
| EP | 0335555 | 10/1989 |
| EP | 0741937 | 11/1996 |

OTHER PUBLICATIONS

Zhang, Lixia, "VirtualClock: A New Traffic Control Algorithm for Packet Switching Networks", Association for Computing Machinery, XEROX Palo Alto Research Center, Palo Alto, CA, 1990, pp. 19-29.

* cited by examiner

*Primary Examiner* — Paul Yanchus, III
*Assistant Examiner* — Joshua Neveln
(74) *Attorney, Agent, or Firm* — Rory D. Rankin; Meyertons, Hood, Kivlin, Kowert & Goetzel, P.C.

(57) ABSTRACT

Systems and methods for managing fast to slow links in a bus fabric. A pair of link interface units connect agents with a clock mismatch. Each link interface unit includes an asynchronous FIFO for storing transactions that are sent over the clock domain crossing. When the command for a new transaction is ready to be sent while data for the previous transaction is still being sent, the link interface unit prevents the last data beat of the previous transaction from being sent. Instead, after a delay of one or more clock cycles, the last data beat overlaps with the command of the new transaction.

24 Claims, 8 Drawing Sheets

MANAGING FAST TO SLOW LINKS IN A BUS FABRIC

BACKGROUND

1. Field of the Invention

The present invention relates generally to the field of computer systems, and in particular to methods and mechanisms for managing links in a bus fabric.

2. Description of the Related Art

Systems on chips (SoCs) are becoming increasingly complex with large numbers of agents and circuits within a typical SoC. Often, data will be shared among the different agents of the SoC, and a bus fabric may be utilized to connect the agents to each other. Some of the agents may be running at different clock speeds, and so communicating from agent to agent may involve a clock domain crossing. When transferring data between agents with different clock frequencies, bubbles may be introduced at the agent with the slower clock frequency. These bubbles may result in increased latency and reduced bandwidth utilization for links between agents with clock frequency mismatches.

SUMMARY

Systems and methods for managing fast to slow links in a bus fabric are contemplated.

In one embodiment, a system on chip (SoC) may include a plurality of link interface units (LIUs) utilized within the bus fabric of the SoC. A pair of LIUs may connect two separate agents together, and the two separate agents may operate at different clock frequencies. In one embodiment, a first agent may send multiple transactions to a second agent, and the first agent may operate at a faster clock rate than the second agent. The transactions may be transferred from the first agent to the second agent via the LIU-to-LIU connection.

The first agent may utilize a first LIU, and the second agent may utilize a second LIU. The transactions may be transferred from a transmit unit of the first LIU to a receive unit of the second LIU. When a first transaction is being sent from the transmit unit of the first LIU to the receive unit of the second LIU, the transmit unit of the first LIU may be notified that a second transaction also needs to be forwarded to the second LIU. As the data beats of the first transaction are being sent, the command of the second transaction may be received, or may be on its way. Therefore, the transmit unit of the first LIU may hold up the last data beat of the first transaction until the command of the second transaction is ready. Then, the last data beat of the first transaction may be sent at the same time as the command of the second transaction.

These and other features and advantages will become apparent to those of ordinary skill in the art in view of the following detailed descriptions of the approaches presented herein.

BRIEF DESCRIPTION OF THE DRAWINGS

The above and further advantages of the methods and mechanisms may be better understood by referring to the following description in conjunction with the accompanying drawings, in which.

DETAILED DESCRIPTION OF EMBODIMENTS

Figure 1:
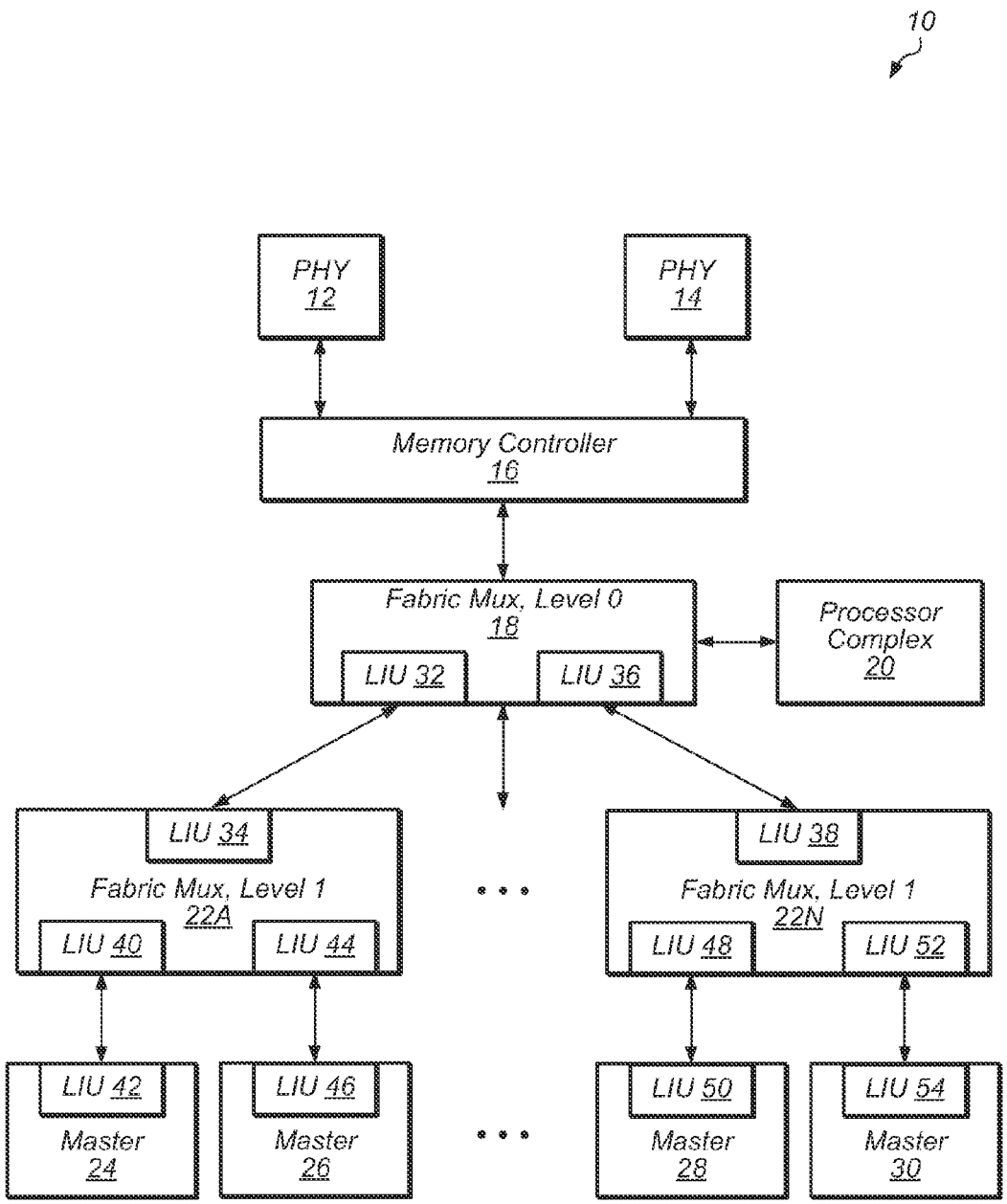
FIG. 1 is a block diagram illustrating one embodiment of a portion of an integrated circuit (IC).

In the following description, numerous specific details are set forth to provide a thorough understanding of the methods and mechanisms presented herein. However, one having ordinary skill in the art should recognize that the various embodiments may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

This specification includes references to "one embodiment". The appearance of the phrase "in one embodiment" in different contexts does not necessarily refer to the same embodiment. Particular features, structures, or characteristics may be combined in any suitable manner consistent with this disclosure. Furthermore, as used throughout this application, the word "may" is used in a permissive sense (i.e., meaning having the potential to), rather than the mandatory sense (i.e., meaning must). Similarly, the words "include", "including", and "includes" mean including, but not limited to.

Terminology. The following paragraphs provide definitions and/or context for terms found in this disclosure (including the appended claims):

"Comprising." This term is open-ended. As used in the appended claims, this term does not foreclose additional structure or steps. Consider a claim that recites: "An apparatus comprising a link interface unit . . . . " Such a claim does not foreclose the apparatus from including additional components (e.g., a processor complex, a memory device, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. §112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, in a memory controller having five ports, the terms "first" and "second" ports can be used to refer to any two of the five ports.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

Referring now to FIG. 1, a block diagram illustrating one embodiment of a portion of an integrated circuit (IC) is shown. In the illustrated embodiment, IC 10 includes processor complex 20, level 0 fabric mux 18, level 1 fabric muxes 22A-N, masters 24, 26, 28, and 30, memory controller 16, and memory physical interface circuits (PHYs) 12 and 14. It is noted that IC 10 may also include many other components not shown in FIG. 1. In various embodiments, IC 10 may also be referred to as a system on chip (SoC), an application specific integrated circuit (ASIC), or an apparatus. Clock sources, such as phase lock loops (PLLs), and power sources are not shown for ease of illustration. Components shown within IC 10 may be coupled to each other using any suitable bus and/or interface mechanism.

Processor complex 20 may include any number of central processing units (CPUs) (not shown), a supporting cache hierarchy including a level two (L2) cache (not shown), and a variety of other components and logic. The CPU(s) of processor complex 20 may include circuitry to execute instructions defined in an instruction set architecture. Specifically, one or more programs comprising the instructions may be executed by the CPU(s). Any instruction set architecture may be implemented in various embodiments. For example, in one embodiment, the ARM™ instruction set architecture (ISA) may be implemented. The ARM instruction set may include 16-bit (or Thumb) and 32-bit instructions. Other exemplary ISA's may include the PowerPC™ instruction set, the MIPS™ instruction set, the SPARC™ instruction set, the x86 instruction set (also referred to as IA-32), the IA-64 instruction set, etc.

In various embodiments, level 0 fabric mux 18 and level 1 fabric muxes 22A-N may constitute a communication fabric (or fabric) for providing a top-level interconnect for IC 10. In various embodiments, different types of traffic may flow independently through the fabric. The independent flow may be accomplished by allowing a single physical fabric bus to include a number of overlaying virtual channels, or dedicated source and destination buffers, each carrying a different type of traffic. Each channel may be independently flow controlled with no dependence between transactions in different channels. In other embodiments, the fabric shown in FIG. 1 may include one or more other units, two or more units may be combined into a single unit, and/or one or more units may be omitted.

As shown in FIG. 1, communication between many of the components of IC 10 may be facilitated by link interface units (LIUs). LIUs may be interspersed throughout the fabric and logic of IC 10 in various locations. Each LIU may provide a point-to-point communications link between two agents in IC 10. The LIU may provide buffering and may manage the credit-based flow control mechanism for subchannels of traffic between the various agents of IC 10. As shown in FIG. 1, IC 10 may include the following LIU pairs, LIUs 32 and 34, 36 and 38, 40 and 42, 44 and 46, 48 and 50, and 52 and 54. In other embodiments, LIUs may be located in other components and/or one or more of the LIU pairs shown in FIG. 1 may be omitted. In one embodiment, the various LIUs of IC 10 may be identical to each other. In another embodiment, some of the LIUs within IC 10 may differ from other LIUs. For example, the size of buffers and the control logic within a LIU may be configured differently from other LIUs.

In various embodiments, IC 10 may also include circuitry in the fabric to ensure coherence among different masters and other I/O devices. This circuitry may include cache coherency logic employing a cache coherency protocol to ensure data accessed by each master is kept up to date. An example of a cache coherency protocol includes the MOESI protocol with the Modified (M), Owned (O), Exclusive (E), Shared (S), and Invalid (I) states.

Masters 24-30 are representative of any number and type of components which may be coupled to the fabric of IC 10. For example, masters 24-30 may include one or more cameras, flash controllers, display controllers, media controllers, graphics units, and/or other devices. Masters 24-30 are also representative of any number of I/O interfaces or devices and may provide interfaces to any type of peripheral device implementing any hardware functionality included in the system. For example, any of the masters 24-30 may connect to audio peripherals such as microphones, speakers, interfaces to microphones and speakers, audio processors, digital signal processors, mixers, etc. Other I/O devices may include interface controllers for various interfaces external to IC 10, including interfaces such as Universal Serial Bus (USB), peripheral component interconnect (PCI) including PCI Express (PCIe), serial and parallel ports, general-purpose I/O (GPIO), a universal asynchronous receiver/transmitter (uART), a FireWire interface, an Ethernet interface, an analog-to-digital converter (ADC), a DAC, and so forth. Other I/O devices may also include networking peripherals such as media access controllers (MACs).

Memory controller 16 may include any number of memory ports and may include circuitry configured to interface to memory. For example, memory controller 16 may be configured to interface to dynamic random access memory (DRAM) such as synchronous DRAM (SDRAM) (including mobile versions of the SDRAMs such as mDDR3, etc., and/or low power versions of the SDRAMs such as LPDDR2, etc.), RAMBUS DRAM (RDRAM), double data rate (DDR) SDRAM, DDR2 SDRAM, Rambus DRAM (RDRAM), static RAM (SRAM), GDDR4 (Graphics Double Data Rate, version 4) SDRAM, GDDR5 (Graphics Double Data Rate, version 5) SDRAM, etc. Memory controller 16 may also be coupled to memory physical interface circuits (PHYs) 12 and 14. Memory PHYs 12 and 14 are representative of any number of memory PHYs which may be coupled to memory controller 16. Memory PHYs 12 and 14 may be configured to interface to memory devices (not shown). Memory PHYs 12 and 14 may handle the low-level physical interface to the memory devices. For example, the memory PHYs 12 and 14 may be responsible for the timing of the signals, for proper clocking to synchronous DRAM memory, etc.

It is noted that other embodiments may include other combinations of components, including subsets or supersets of the components shown in FIG. 1 and/or other components. While one instance of a given component may be shown in FIG. 1, other embodiments may include two or more instances of the given component. Similarly, throughout this detailed description, two or more instances of a given component may be included even if only one is shown, and/or embodiments that include only one instance may be used even if multiple instances are shown. In addition, in other embodiments, the connections between components of IC 10 may differ from those shown in FIG. 1. For example, direct connections between components may be used for components that are not directly connected in FIG. 1, and components with direct connections in FIG. 1 may instead connect via one or more other components.

Figure 2:
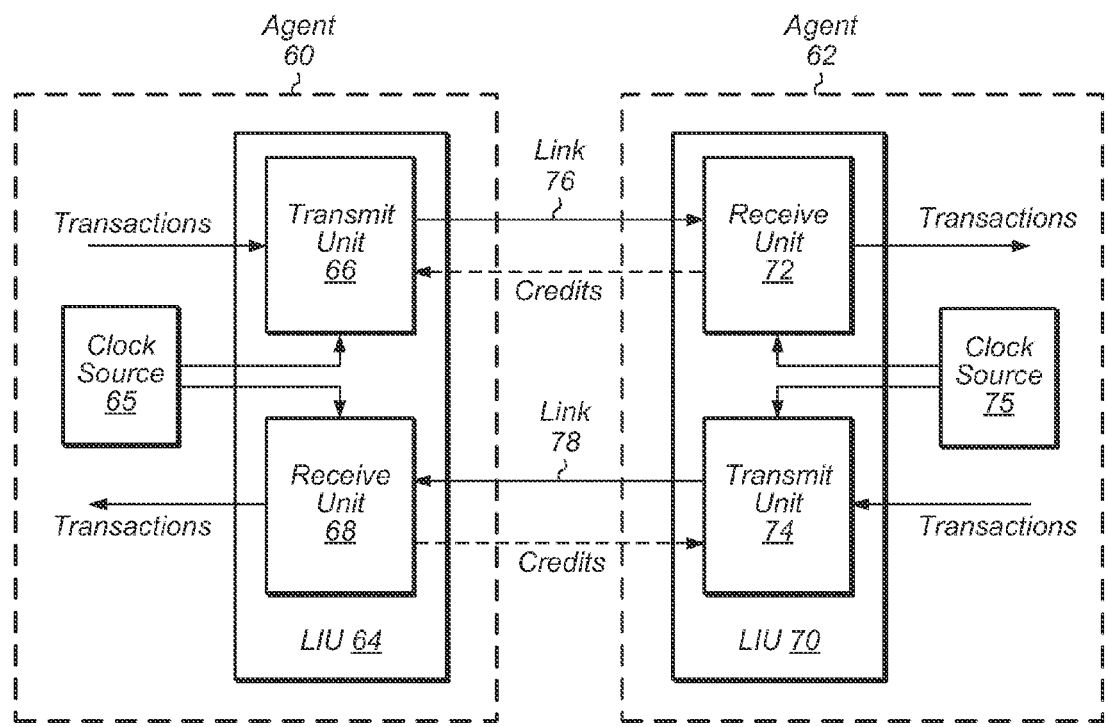
FIG. 2 is a block diagram of one embodiment of a pair of link interface units (LIUs).

Turning now to FIG. 2, a block diagram of one embodiment of a pair of link interface units (LIUs) is shown. Agents 60 and 62 may be connected together and may communicate via LIU 64 and LIU 70. Each LIU may include a receive unit and a transmit unit. For example, LIU 64 may include transmit unit 66 and receive unit 68 and LIU 70 may include transmit unit 74 and receive unit 72. The receive units 68 and 72 may include various storage elements (not shown) for storing transactions sent from transmit units 74 and 66, respectively. In one embodiment, the storage elements may include an interface first-in, first-out (FIFO) queue and multiple buffers. The interface FIFO, which may also be referred to as an asynchronous FIFO, may be used to store data to reconcile the clock speed difference between LIUs. For each virtual channel (VC) being used in the SoC, a buffer may be utilized to store the transactions for the corresponding VC. Data may be read out of the interface FIFO and written to a corresponding VC buffer.

Each agent may provide its own clock source to its respective LIU. For example, agent 60 may include clock source 65 which may generate and provide a clock to transmit unit 66 and receive unit 68 of LIU 64. Also, agent 62 may include clock source 75 which may generate and distribute this clock to receive unit 72 and transmit unit 74 of LIU 70. Clock source 65 may be independent of clock source 75, and these two clock sources may generate clocks at different clock frequencies. In some embodiments, clock source 65 and clock source 75 may generate clocks at the same frequency, but these clocks may not be synchronized, and transferring data between agents 60 and 62 may require an asynchronous clock domain crossing.

The transmit units 66 and 74 may receive transactions from agents 60 and 62, respectively, and then transmit these transactions on the fabric link to the corresponding receive unit. Receive units 68 and 72 may receive transactions from the fabric link and then transmit these transactions to their host agent. It is noted that the term "transaction" may be used to refer to a "memory transaction", "input/output (I/O) transaction", or other type of transaction. Generally speaking, a transaction may comprise a memory request, and the term "memory request" is not limited to requests that are ultimately responded to by memory, but can also include requests that are satisfied by a cache. It is also noted that the terms "memory request" and "transaction" may be used interchangeably throughout this disclosure.

Transmit unit 66 may be coupled to receive unit via link 76 and transmit unit 74 may be coupled to receive unit 68 via link 78. Link 76 and link 78 may also be referred to as buses. Each of link 76 and link 78 may have the capacity to transfer a command and data beat simultaneously on the same clock cycle. This capacity may be utilized in certain scenarios to transfer a command for a new transaction while simultaneously transferring the last data beat of a previous transaction. The transmit units 66 and 74 may receive credits from receive units 68 and 72, respectively, as indicated by the dashed lines. The buffer management for received transactions may be handled by receive units 68 and 72. The transmit units 66 and 74 may provide credit availability to the agents and the agents may arbitrate between the different virtual channels (VCs) accordingly. For example, in one embodiment, receive units 72 and 74 may have separate storage buffers for separate VCs. If a given VC has space available in its corresponding buffer, while other VCs have completely filled buffers, then the transmit unit may have credits available for the given VC. This availability of credits for the given VC may be communicated to the host agent, and then as a result, the host agent may choose to forward a transaction for this given VC. In various embodiments, receive units 68 and 72 may also send a token to transmit units 74 and 66, respectively, to indicate the availability of an entry in the interface FIFO. A "token" may be defined as a flow control credit for an entry in the interface FIFO. In one embodiment, transmit units 66 and 74 may determine whether to overlap a data beat of a previous transaction with the command of a new transaction based on token availability.

Figure 3:
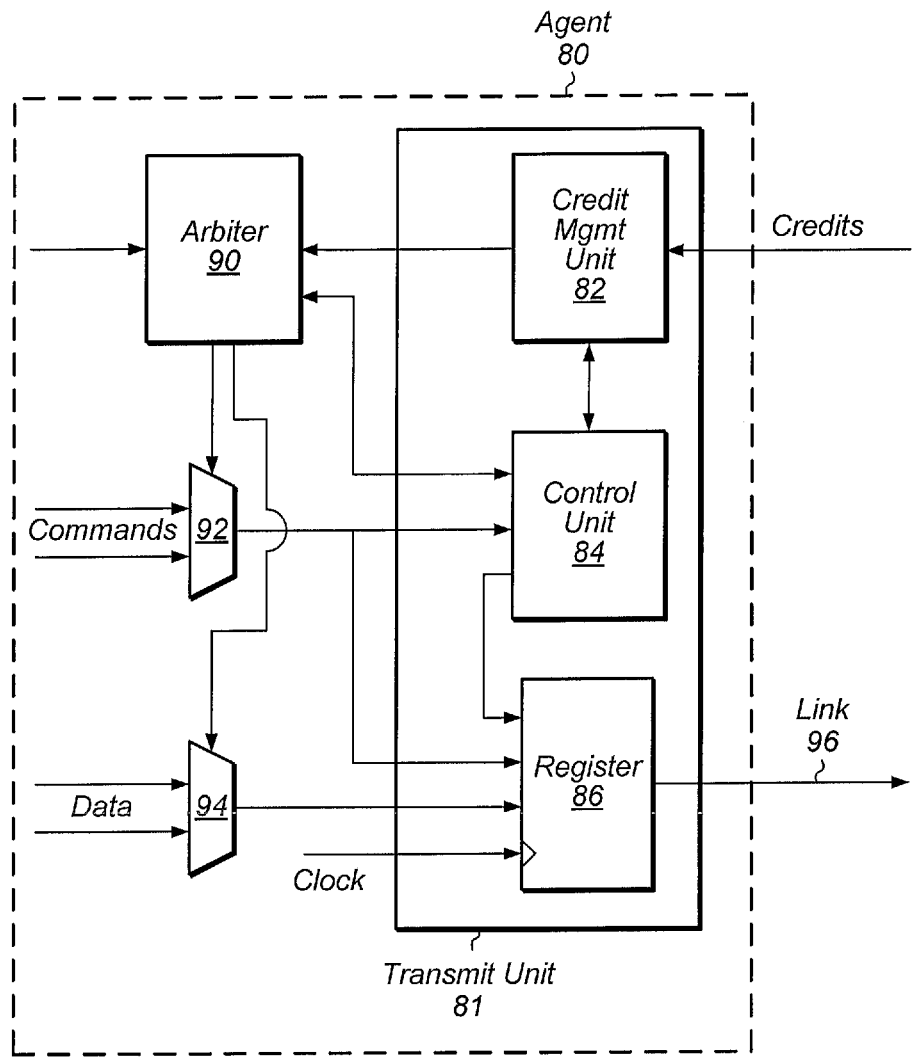
FIG. 3 is a block diagram of one embodiment of a transmit unit.

Referring now to FIG. 3, a block diagram of a transmit unit of a LIU is shown. Transmit unit 81 may be located within a LIU of any agent within an IC. Transmit unit 81 may be configured to receive transactions from an agent and then forward the transactions to a receive unit (not shown) of an adjacent LIU. The transactions received by transmit unit 81 may be categorized into two different types, either data-bearing or non-data-bearing. Data bearing transactions may include write transactions and read responses.

Transmit unit 81 may include credit management unit 82, which is configured to receive and manage credits and tokens from the receive unit of the adjacent LIU. Unit 82 may also share status information, such as the number of credits available per subchannel, with arbiter 90. Arbiter 90 may receive pre-processed commands from agent 80 and determine which transaction to forward to transmit unit 81 based on the current credit status. Arbiter 90 may communicate with control unit 84 regarding which transactions have been selected for transmission to the adjacent receive unit. Arbiter 90 may also generate the select signals for muxes 92 and 94 to determine which command and data beats are selected for forwarding to register 86 of transmit unit 81. Register 86, although shown as a single register, is representative of any number of registers which may be used to hold and clock commands and data through on link 96. Although muxes 92 and 94 are shown with only two inputs, this is for illustrative purposes only. Muxes 92 and 94 may have any number of inputs and the select signals coupled from arbiter 90 may select from these inputs.

The command and data that pass through muxes 92 and 94 may be coupled to register 86, and then control unit 84 may control register 86 based on the inputs received from credit management unit 82 and arbiter 90. For example, for a typical data bearing transaction, control unit 84 may send the command on a first clock cycle and then the first data beat on the following clock cycle. The command being immediately followed by the first data beat may be defined in a protocol for one particular type of bus fabric. Control unit 84 may then continue to send the remaining data beats for this data bearing transaction.

In one embodiment, control unit 84 may know the relationship between the clock source of agent 81 and the clock source of the adjacent agent to which transmit unit 81 forwards data. In some scenarios, the frequency of the clock utilized by agent 80 may be greater than or equal to the frequency of the clock utilized by the adjacent agent. In these scenarios, when control unit 84 is ready to send the last data beat of a given transaction, control unit 84 may determine whether to hold up the last data beat for a clock cycle if there is another pending transaction. In one embodiment, arbiter 90 may send an intend-to-overlap signal to control unit 84, and in response to receiving this signal, control unit 84 may wait one clock cycle and then send the last data beat of the current transaction with the command of the next transaction. This overlapping of the command with the last data beat may be sent prior to all of the data beats having already been gathered by agent 80. This can be performed because the relationship between the clocks is known and it can be assumed that the data beats will arrive in time to be sent on the link since agent 80 has a clock faster than or equal to the adjacent agent's clock. This overlapping of the command with the last data beat may allow the bandwidth of the link between LIU 81 and the adjacent agent to be maximized.

The decision whether to overlap the command of a new transaction with the last data beat of the previous transaction may be based on a variety of factors. For example, in one embodiment, if the available bandwidth of link 96 is below a threshold, then overlapping may be enabled. In some embodiments, the token availability, corresponding to the available space in the adjacent LIU, may be the determining factor, such that if the token availability is below a threshold, then overlapping may be enabled. Also, overlapping may only be enabled for certain VCs, and so the VC of a given transaction may be checked prior to deciding whether to overlap the command with the last data beat.

Figure 4:
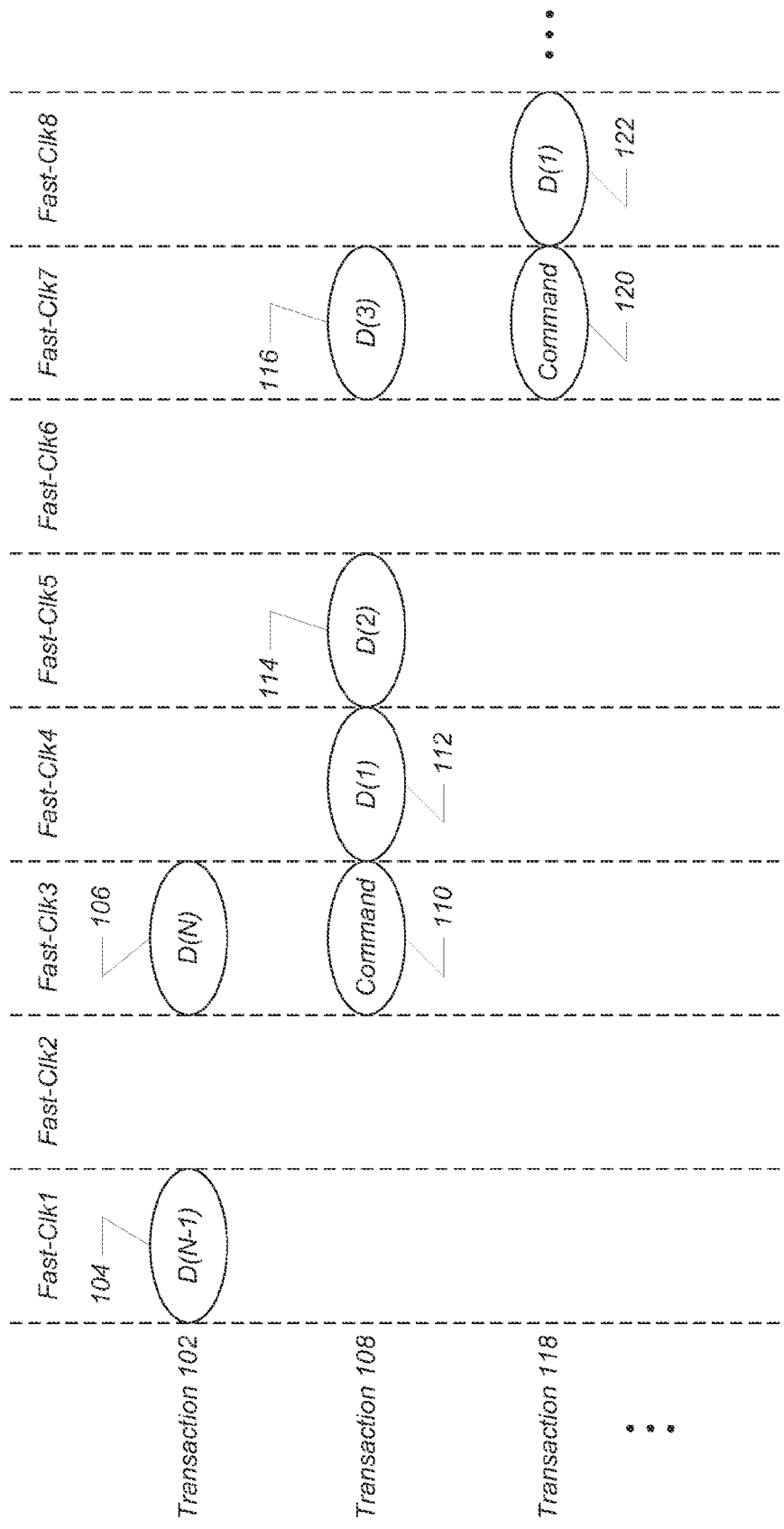
FIG. 4 illustrates a timing diagram of the transmission of commands and data beats for multiple transactions.

Turning now to FIG. 4, a timing diagram is shown illustrating the transmission of command and data beats for multiple transactions. Transactions 102, 108, and 118 may be sent from the transmit unit of a first LIU to the receive unit of a second LIU. It may be assumed for the purposes of this discussion that transactions 102, 108, and 118 are sent in consecutive order. In other words, the transmit unit of the first LIU may send transaction 102 first, followed by transaction 108, and then transaction 118 last. It may also be assumed that there is a clock mismatch between the first and second LIUs and that the first LIU has the faster clock. The clock cycles shown at the top of the timing diagram (FAST-CLK1-8) are the clock cycles of the fast clock domain of the first LIU.

Only the last two data beats of transaction 102 are shown in the timing diagram. Data beat 104, or D(N−1), may be the second to the last data beat for transaction 102. Data beat 104 may be transmitted on clock cycle 1. In clock cycle 2, the transmit unit held up the last data beat 106 and prevented it from being sent. It may be assumed that the transmit unit either detected or was notified that command 110 of transaction 108 would be available for forwarding in the next clock cycle. Therefore, in clock cycle 3, the last data beat 106, D(N), of transaction 102 may be sent simultaneously with command 110, or C(1), of transaction 108. This overlap of the command of transaction 108 with the last data beat of transaction 102 may maximize the bandwidth for the connection between the first and second LIUs. This overlap may be possible if command 110 is available to be sent during clock cycle 3. Also, command 110 may be sent before all of the data beats of transaction 108 have been gathered at the transmit unit. For the second LIU in the slow domain, the token return rate will be slower than the token consumption rate of the first LIU in the fast domain. Therefore, tokens will naturally run low at the transmit unit due to the clock frequency mismatch. The bubble in clock cycle 2 may be introduced in the fast domain as there is a chance that the clock mismatch will produce bubbles in the slow domain. By overlapping data beat 106 and command 110, the bandwidth on the link may be optimized.

Although it is shown that the last data beat 106 is held up only one clock cycle, in other scenarios, the last data beat may be held up two or more clock cycles. In some cases, there may be a limit set as to how long the last data beat will be held up, and if it is expected to take more than a certain number of clock cycles, then the last data beat may not be held up and instead may be sent in the clock cycle immediately following the preceding data beat.

Data beats 112 and 114, or D(1) and D(2), of transaction 108 may be sent in clock cycles 4 and 5, respectively. The transmit unit may then prevent the last data beat 116, or D(3), from being sent until command 120 of the next transaction (transaction 118) is ready to be sent. Therefore, the transmit unit may hold off sending data beat 116 until clock cycle 7 while simultaneously sending command 120. Command 120 may be followed by data beat 122 in clock cycle 8 and any number of other data beats (not shown).

Figure 5:
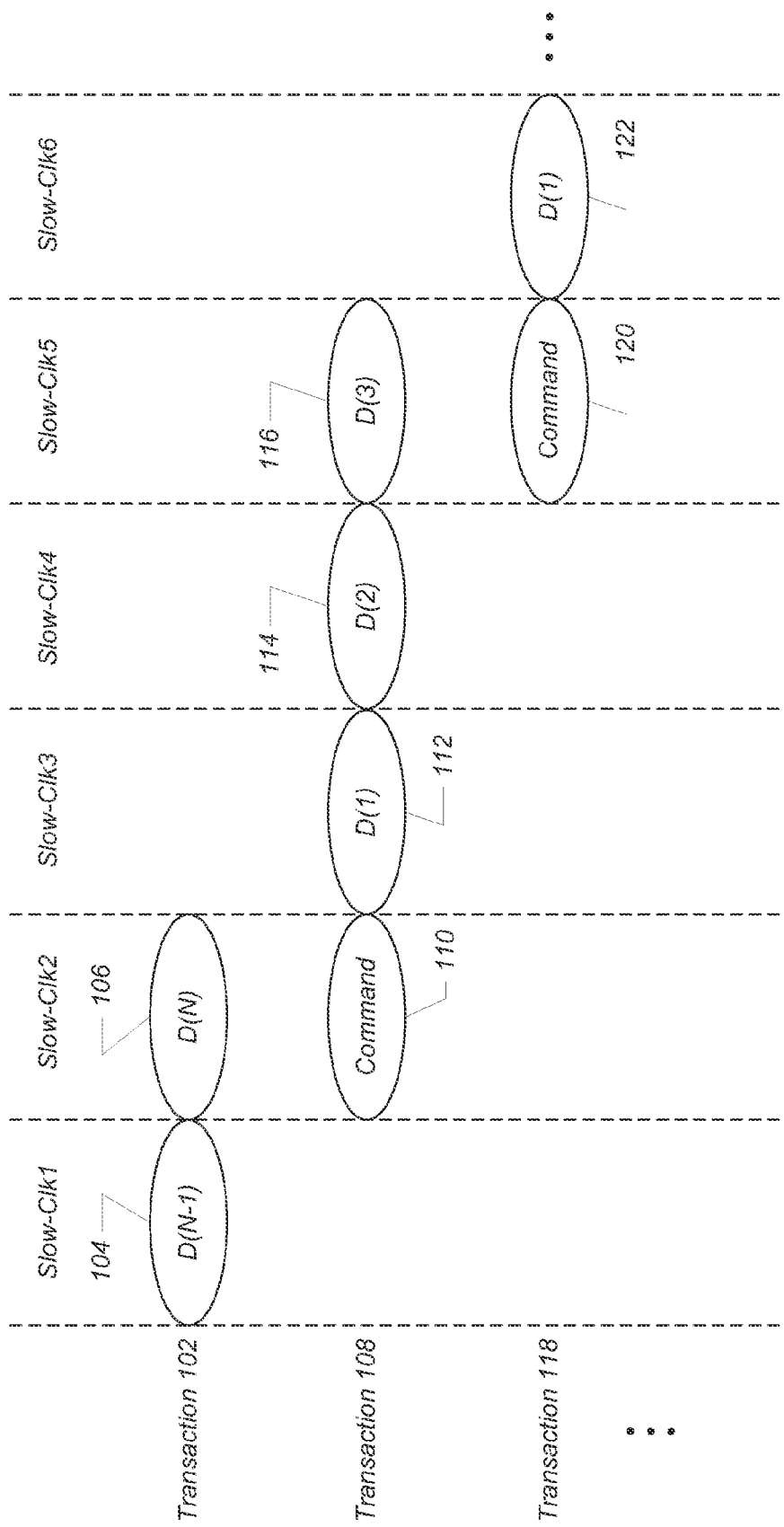
FIG. 5 illustrates a timing diagram of the transmission of commands and data beats for multiple transactions for a receiving agent with a slow clock.

Referring now to FIG. 5, a timing diagram is shown illustrating the receipt of command and data beats for multiple transactions at an agent with a slow clock. The timing diagram shown in FIG. 5 is a continuation of the example shown in FIG. 4. It is noted that the timing diagram shown in FIG. 5 is an ideal case that may only exist in certain operating conditions. In other embodiments, the timing may differ for transactions 102, 108, and 118 depending on the relationship between the clocks for between the transmitting and receiving agents.

FIG. 5 illustrates the improvement in bandwidth utilization that may result in one particular scenario using the scheme shown in FIG. 4 when transmitting transactions from the fast agent. The fast agent may deliberately generate bubbles while transmitting to the slow agent based on the knowledge that the slow agent will be reading transactions out of its interface FIFO at a slower rate than the fast agent is able to write transactions into the interface FIFO. If the relationship between the clocks is such that the slow agent always has transactions available in its interface FIFO, then the slow agent may be able to read out of the FIFO on every clock cycle as is shown in FIG. 5.

In other embodiments, when the relationship between the clocks of the transmitting and receiving agents is not ideal, one or more of the bubbles introduced at the transmitting agent may propagate to the receiving agent. However, even in these cases, the overlapping of the command of a new transaction with the last data beat of the previous transaction provides an improvement of the bandwidth utilization at the receiving agent. Rather than using two clock cycles to read out the last data beat of the previous transaction and the command of the new transaction, the receiving agent will be able to read both out of the interface FIFO in a single clock cycle.

Figure 6:
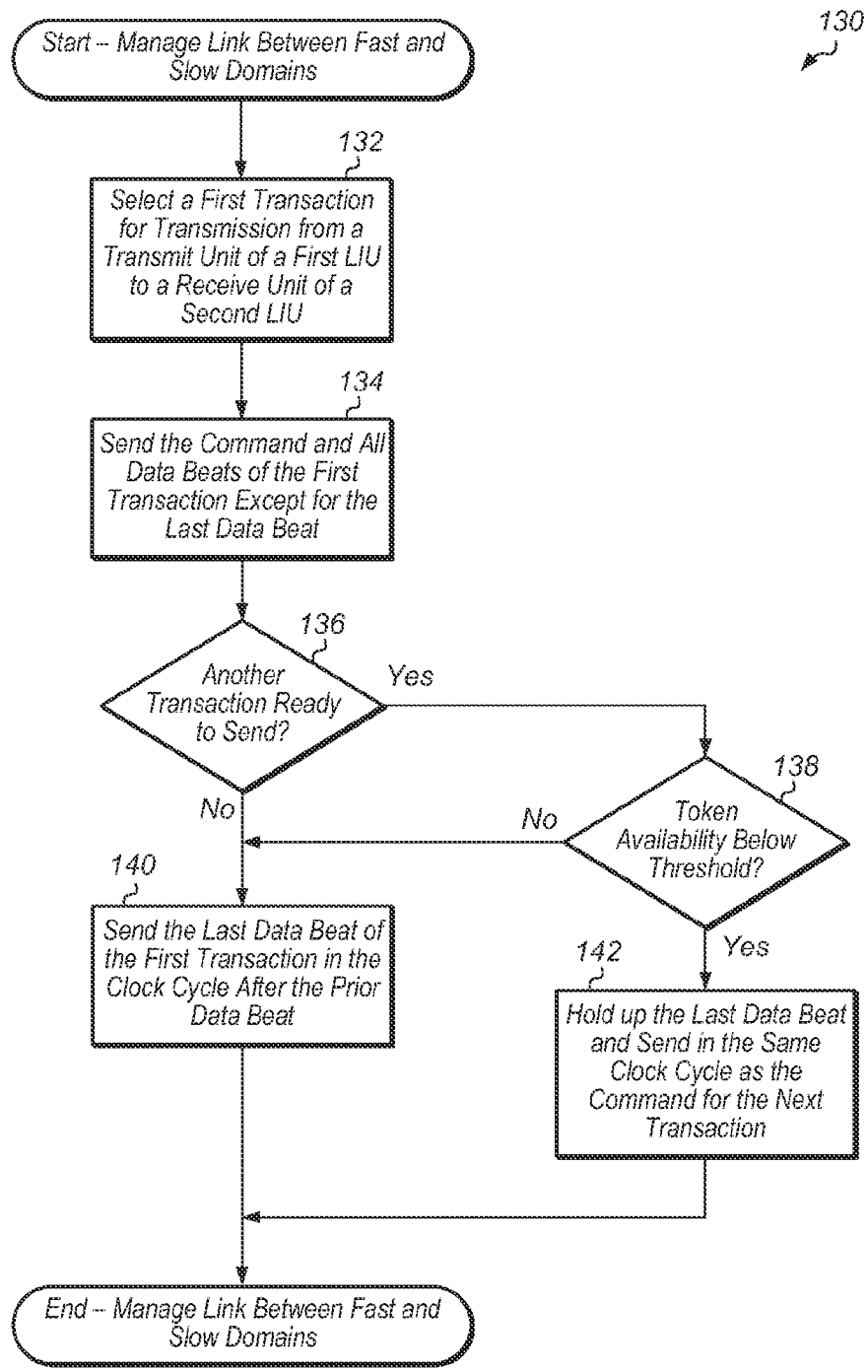
FIG. 6 is a generalized flow diagram illustrating one embodiment of a method for managing a fast to slow link.

Turning now to FIG. 6, one embodiment of a method 130 for managing a link from a fast to slow domain is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired.

In one embodiment, a first transaction may be selected for transmission from a transmit unit of a first LIU to a receive unit of a second LIU (block 132). The first transaction may be selected for transmission by an arbiter of the transmit unit. It may be assumed for the purposes of this discussion that the first transaction includes a command and one or more data beats. It may also be assumed that the first and second LIUs are operating in different clock domains, and that the clock source of the first LIU has a clock frequency which is greater than or equal to the clock source of the second LIU. It may further be assumed that the first transaction is using a virtual channel (VC) for which data packing is enabled. In some embodiments, data packing may be enabled for some VCs while it is disabled for other VCs.

Next, the transmit unit of the first LIU may send the command and all data beats of the first transaction except for the last data beat to the receive unit of the second LIU (block 134). Then, prior to sending the last data beat of the first transaction, the transmit unit may determine if there is another transaction ready to be sent in the next few clock cycles (conditional block 136). In one embodiment, an intend-to-overlap signal may be sent from the arbiter to a control unit of the transmit unit, and this signal may indicate if there is another transaction ready to be sent. Alternatively, the transmit unit may query back a few stages in the pipeline to determine if there is another transaction making its way to the transmit unit. The number of clock cycles that the transmit unit is willing to wait for the next transaction may vary depending on the embodiment.

If there is a command of the next transaction ready to be sent (conditional block 136, "yes" leg), then the transmit unit may determine how many available tokens it currently holds (conditional block 138). The number of available tokens may be equal to the number of empty slots in the interface FIFO in the receive unit. If there is not a command of a pending transaction ready to be sent (conditional block 136, "no" leg), then the last data beat for the first transaction may be sent immediately without being held up (block 140).

If the number of available tokens is below a threshold (conditional block 138, "yes" leg), then the last data beat of the first transaction may be sent with the command of the next transaction to the receive unit of the second LIU (block 142). In other words, the last data beat may be held up for one or more clock cycles and then sent to the receive unit on the same clock cycle as the command of the next transaction. The threshold may vary depending on the embodiment and/or the number of data beats of the next transaction. If the number of available tokens is above the threshold (conditional block 138, "no" leg), then the last data beat for the first transaction may be sent immediately without being held up (block 140). After blocks 140 and 142, method 130 may end.

Figure 7:
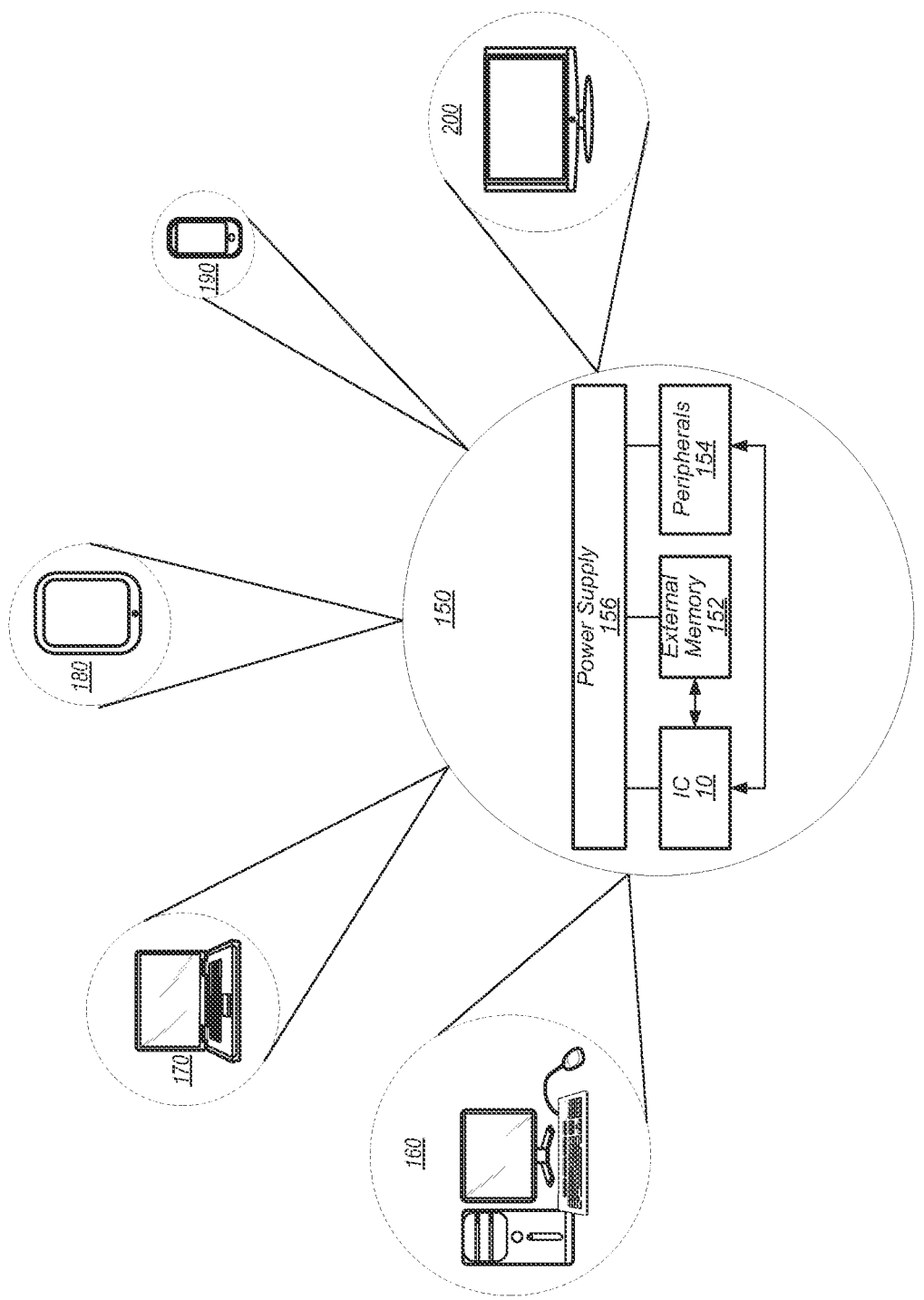
FIG. 7 is a block diagram of one embodiment of a system.

Referring now to FIG. 7, a block diagram of one embodiment of a system 150 is shown. As shown, system 150 may represent chip, circuitry, components, etc., of a desktop computer 160, laptop computer 170, tablet computer 180, cell phone 190, television 200 (or set top box configured to be coupled to a television), or otherwise. In the illustrated embodiment, the system 150 includes at least one instance of IC 10 (of FIG. 1) coupled to an external memory 152.

IC 10 is coupled to one or more peripherals 154 and the external memory 152. A power supply 156 is also provided which supplies the supply voltages to IC 10 as well as one or more supply voltages to the memory 152 and/or the peripherals 154. In various embodiments, power supply 156 may represent a battery (e.g., a rechargeable battery in a smart phone, laptop or tablet computer). In some embodiments, more than one instance of IC 10 may be included (and more than one external memory 152 may be included as well).

The memory 152 may be any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR2, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc. Alternatively, the devices may be mounted with IC 10 in a chip-on-chip configuration, a package-on-package configuration, or a multichip module configuration.

The peripherals 154 may include any desired circuitry, depending on the type of system 150. For example, in one embodiment, peripherals 154 may include devices for various types of wireless communication, such as wifi, Bluetooth, cellular, global positioning system, etc. The peripherals 154 may also include additional storage, including RAM storage, solid state storage, or disk storage. The peripherals 154 may include user interface devices such as a display screen, including touch display screens or multitouch display screens, keyboard or other input devices, microphones, speakers, etc.

Figure 8:
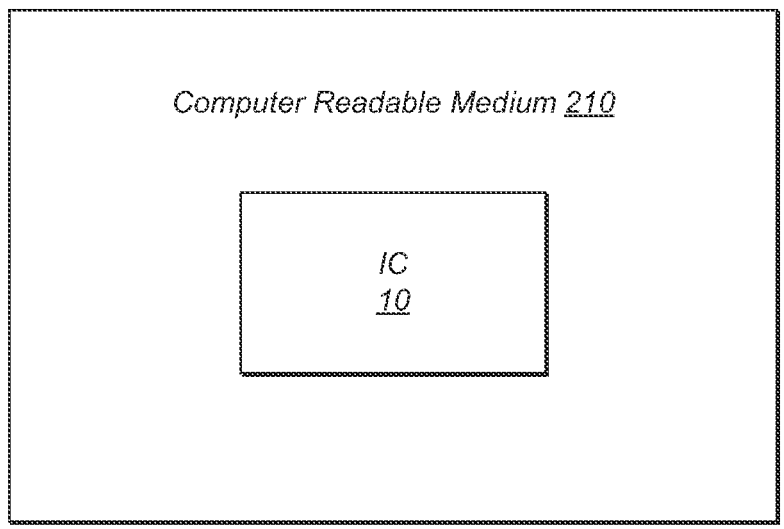
FIG. 8 is a block diagram of one embodiment of a computer readable medium.

Turning now to FIG. 8, one embodiment of a block diagram of a computer readable medium 210 including one or more data structures representative of the circuitry included in IC 10 (of FIG. 1) is shown. Generally speaking, computer readable medium 210 may include any non-transitory storage media such as magnetic or optical media, e.g., disk, CD-ROM, or DVD-ROM, volatile or non-volatile memory media such as RAM (e.g. SDRAM, RDRAM, SRAM, etc.), ROM, etc., as well as media accessible via transmission media or signals such as electrical, electromagnetic, or digital signals, conveyed via a communication medium such as a network and/or a wireless link.

Generally, the data structure(s) of the circuitry on the computer readable medium 210 may be read by a program and used, directly or indirectly, to fabricate the hardware comprising the circuitry. For example, the data structure(s) may include one or more behavioral-level descriptions or register-transfer level (RTL) descriptions of the hardware functionality in a high level design language (HDL) such as Verilog or VHDL. The description(s) may be read by a synthesis tool which may synthesize the description to produce one or more netlists comprising lists of gates from a synthesis library. The netlist(s) comprise a set of gates which also represent the functionality of the hardware comprising the circuitry. The netlist(s) may then be placed and routed to produce one or more data sets describing geometric shapes to be applied to masks. The masks may then be used in various semiconductor fabrication steps to produce a semiconductor circuit or circuits corresponding to the circuitry. Alternatively, the data structure(s) on computer readable medium 210 may be the netlist(s) (with or without the synthesis library) or the data set(s), as desired. In yet another alternative, the data structures may comprise the output of a schematic program, or netlist(s) or data set(s) derived therefrom. While computer readable medium 210 includes a representation of IC 10, other embodiments may include a representation of any portion or combination of portions of IC 10 (e.g., link interface unit 32).

It should be emphasized that the above-described embodiments are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. A link interface unit (LIU) comprising a transmit unit, wherein the LIU is located in a first clock domain, wherein the first clock domain is running at a first clock frequency, and wherein the transmit unit is configured to:
send a command and one or more data beats of a first transaction to a receive unit in a second clock domain, wherein the second clock domain is running at a second clock frequency, and wherein the first clock frequency is greater than or equal to the second clock frequency;

responsive to determining a command of a second transaction will be ready to send in less than a given number of clock cycles:
  delay a last data beat of the first transaction for one or more clock cycles, where said delay is less than the given number of clock cycles; and
  send the last data beat of the first transaction simultaneously with the command of the second transaction; and
responsive to determining the command of the second transaction will not be ready to send in less than the given number of clock cycles, send the last data beat of the first transaction without said delay.

2. The link interface unit as recited in claim 1, wherein the transmit unit is further configured to accumulate tokens received from the receive unit, and wherein tokens are required for sending data to the receive unit.

3. The link interface unit as recited in claim 2, wherein the transmit unit is configured to delay the last data beat of the first transaction for one or more clock cycles in further response to determining the accumulated tokens are below a predetermined threshold.

4. The link interface unit as recited in claim 1, wherein at least one of the first transaction and the second transaction is a write transaction.

5. The link interface unit as recited in claim 1, wherein determining a command of a second transaction is ready to be sent comprises receiving an indication from an arbiter that the second transaction has been selected for transmission.

6. A method comprising:
  sending a command and one or more data beats of a first transaction on a link from a first agent to a second agent, wherein the link crosses clock domains, and wherein a first clock domain of the first agent has a clock frequency greater than or equal to a second clock domain of the second agent;
  responsive to determining a second transaction will be ready to send in less than a given number of clock cycles:
    preventing a last data beat of the first transaction from being sent for one or more clock cycles, where the one or more clock cycles is less than the given number of clock cycles; and
    sending the last data beat of the first transaction in a same clock cycle as a command of the second transaction; and
  responsive to determining the second transaction will not be ready to send in less than the given number of clock cycles, sending the last data beat of the first transaction without preventing the last data beat of the first transaction from being sent for one or more clock cycles.

7. The method as recited in claim 6, wherein a first protocol is defined for the link, and wherein the first protocol specifies that a command and a first data beat of any transaction should be sent on consecutive clock cycles.

8. The method as recited in claim 7, wherein the link provides separate data and command connections, and wherein the separate data and command connections enable the last data beat of the first transaction and the command of the second transaction to overlap in the same clock cycle.

9. The method as recited in claim 8, wherein the second transaction is using a first virtual channel (VC), and wherein overlapping of command and data is enabled for the first VC.

10. The method as recited in claim 9, wherein the indication is sent by an arbiter of the first agent.

11. The method as recited in claim 10, wherein the first agent and second agent are connected via link interface units (LIUs).

12. The method as recited in claim 11, wherein the first agent comprises a first LIU, wherein the second agent comprises a second LIU, and wherein a transmit unit of the first LIU is configured to send the command and the one or more data beats of the first transaction on the link to a receive unit of the second LIU.

13. A method comprising:
  sending one or more data beats of a first transaction from a first link interface unit (LIU) to a second LIU, wherein the first LIU is operating at a first clock frequency greater than or equal to a second clock frequency of the second LIU;
  sending a last data beat of the first transaction after a delay of one or more clock cycles and sending a command of the second transaction in a same clock cycle as the last data beat, responsive to determining the command of the second transaction will be ready to send in less than a given number of clock cycles; and
  sending the last data beat of the first transaction without said delay responsive to determining the command of the second transaction will not be ready to send in less than the given number of clock cycles.

14. The method as recited in claim 13, further comprising sending the command of the second transaction to the second LIU before all data beats of the second transaction are gathered at the first LIU.

15. The method as recited in claim 13, wherein at least one of the first transaction and the second transaction is a write transaction.

16. The method as recited in claim 13, wherein determining the command of the second transaction will be ready to send in less than the given number of clock cycles comprises querying one or more stages in a pipeline.

17. The method as recited in claim 14, wherein determining the command of the second transaction is ready to be sent comprises receiving an intend-to-overlap signal from an arbiter.

18. The method as recited in claim 17, wherein sending the last data beat of the first transaction and the command of the second transaction together in the same clock cycle after the delay of one or more clock cycles is in further response to determining a number of available tokens is below a predetermined threshold.

19. The method as recited in claim 18, wherein the first transaction is sent from a transmit unit of the first LIU to a receive unit of the second LIU.

20. An apparatus comprising:
  a first link interface unit (LIU), wherein the first LIU comprises a transmit unit, and wherein the first LIU is configured to run at a first clock frequency;
  a second LIU, wherein the second LIU comprises a receive unit, wherein the second LIU is configured to run at a second clock frequency, and wherein the first clock frequency is greater than or equal to the second clock frequency;
  wherein the transmit unit of the first LIU is configured to:
    send a command and one or more data beats of a first transaction to the second LIU;
    responsive to determining a command of a second transaction will be ready to send in less than a given number of clock cycles:
      delay sending a last data beat of the first transaction to the second LIU for one or more clock cycles, where said delay is less than the given number of clock cycles; and send the last data beat and the command of the second transaction together to the second LIU in a single clock cycle; and responsive to determining the command of the second transaction will not be ready to send in less than the given number of clock cycles, send the last data beat of the first transaction without said delay.

21. The apparatus as recited in claim 20, wherein the receive unit of the second LIU comprises an interface first-in, first-out (FIFO) queue, and wherein the transmit unit of the first LIU is configured to delay sending the last data beat of the first transaction to the second LIU after the delay of one or more clock cycles in further response to determining a number of available tokens is below a predetermined threshold.

22. The apparatus as recited in claim 21, wherein the last data beat of the first transaction is delayed by one or more clock cycles.

23. The apparatus as recited in claim 22, wherein the receive unit of the second LIU is configured to send a token to the transmit unit of the first LIU responsive to an entry in the interface FIFO queue becoming available.

24. The apparatus as recited in claim 23, wherein the first LIU comprises a receive unit and wherein the second LIU comprises a transmit unit.

* * * * *